Oct. 13, 1970     J. P. DE NICOLA     3,534,315

MATERIAL TESTING

Filed Nov. 8, 1968     3 Sheets-Sheet 1

Oct. 13, 1970  J. P. DE NICOLA  3,534,315

MATERIAL TESTING

Filed Nov. 8, 1968  3 Sheets-Sheet 2

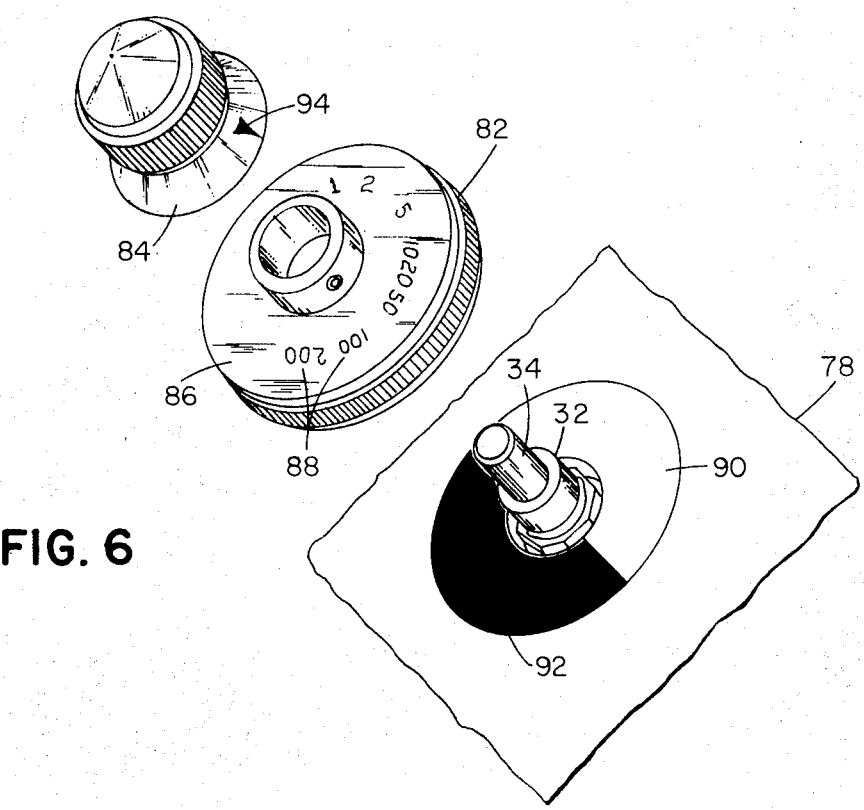
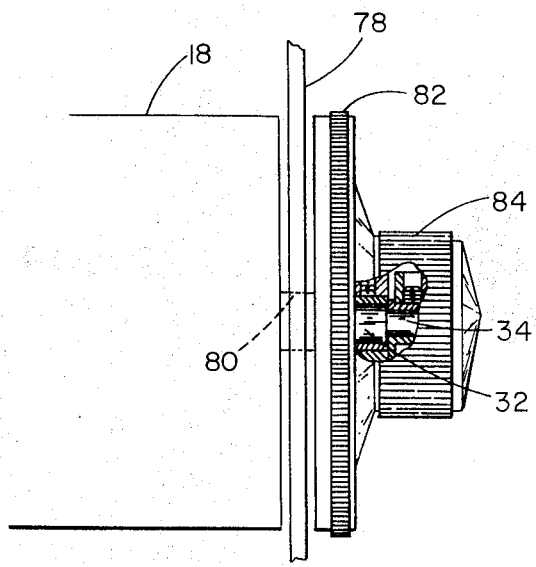
FIG. 6
FIG. 7

United States Patent Office 3,534,315
Patented Oct. 13, 1970

3,534,315
MATERIAL TESTING
Joseph Peter De Nicola, Hingham, Mass., assignor to Instron Corporation, Canton, Mass., a corporation of Massachusetts
Filed Nov. 8, 1968, Ser. No. 774,461
Int. Cl. H01c 1/14, 5/08
U.S. Cl. 338—132                          3 Claims

ABSTRACT OF THE DISCLOSURE

Material testing apparatus employs interchangeable electro-mechanical transducing elements useful over different ranges of a quantity being measured, and an attenuator for receiving the output of the currently operative element, the attenuator including a pair of multi-position switches, one switch providing taps to a series resistance circuit, the other switch controlling the operative location of at least one of the taps, and indicia and an indicator responsive to the relative positions of the switches.

---

This invention relates to material testing machines employing interchangeable electro-mechanical transducing elements useful over different ranges of a quantity being measured.

Objects of the invention are to facilitate the coordination of electrical circuitry and control panel indicia with the particular transducing element in use, with apparatus that is simple, reliable, and easily manipulated and read without operator confusion.

The invention features an attenuator having resistors connected in series, a multi-position switch having electrical taps to different junctions between pairs of the resistors so that for each position of the switch a different total electrical resistance is operatively included in the attenuator, a second multi-position switch electrically interposed between the first switch and the resistors for changing the operative location of at least one of the taps, each position of the second switch thereby providing a different sequence of total electrical resistances corresponding to the positions of the first switch, a portion carrying indicia corresponding to said total resistances, each indicium having positions corresponding respectively to the positions of the second switch, and an indicator having positions corresponding to the positions of the first switch, the indicator indicating a different indicium for each position of the first switch, the indicated indicium for each position of the first switch varying with the position of the second switch. In preferred embodiments the switches are operated respectively by concentric shafts; each sequence of total resistances includes at least one total resistance not present in at least another sequence; the indicia are on a transparent member carried by the operating shaft of the second switch against a stationary background having one zone colored to contrast with the indicia and another zone colored similarly to the indicia, so that only those indicia located in front of the contrasting zone are easily visible.

Other objects, features, and advantages will appear from the following description of a preferred embodiment of the invention, taken together with the attached drawings thereof, in which.

Figure 1:
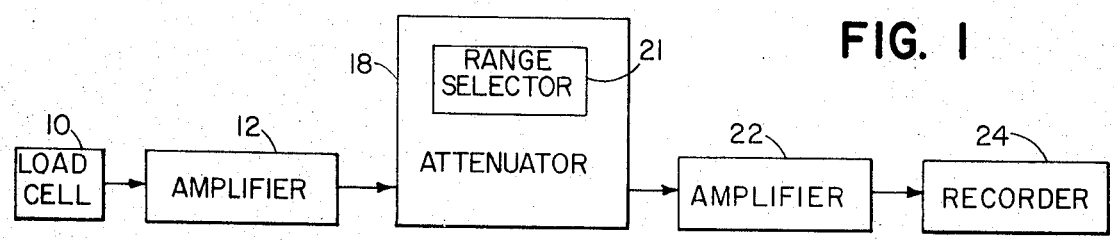
FIG. 1 is a block diagram of materials testing apparatus.
Figure 2:
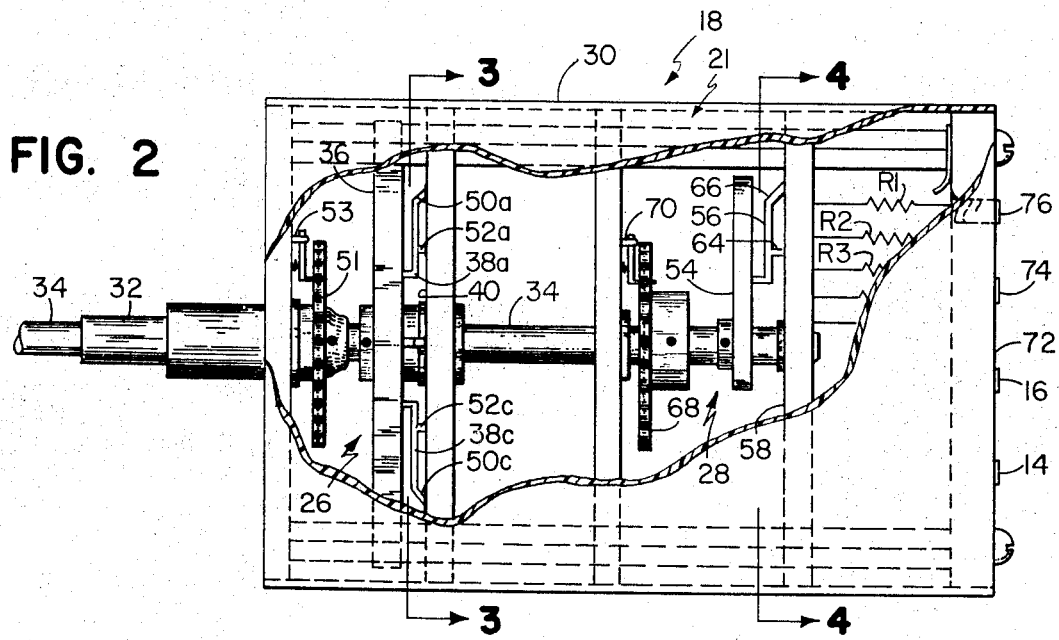
FIG. 2 is a side elevation partly broken away of the range selector indicated in FIG. 1.
Figure 3:
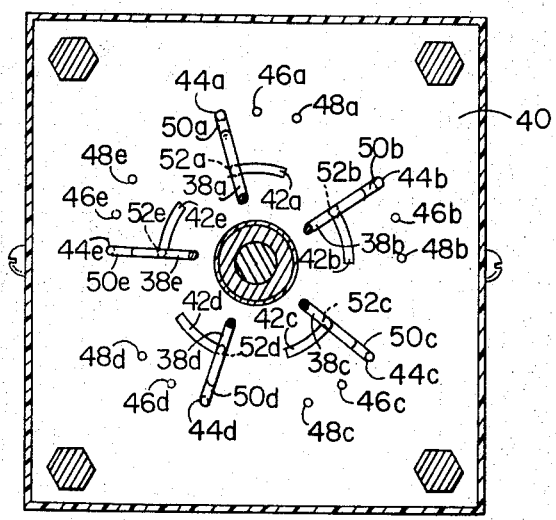
Figure 4:
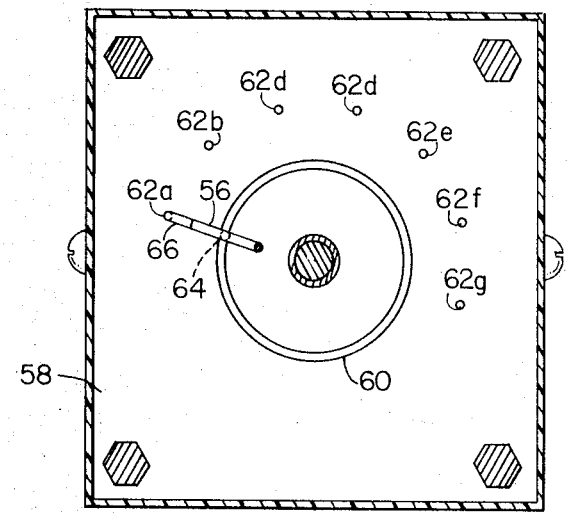
Figure 5:
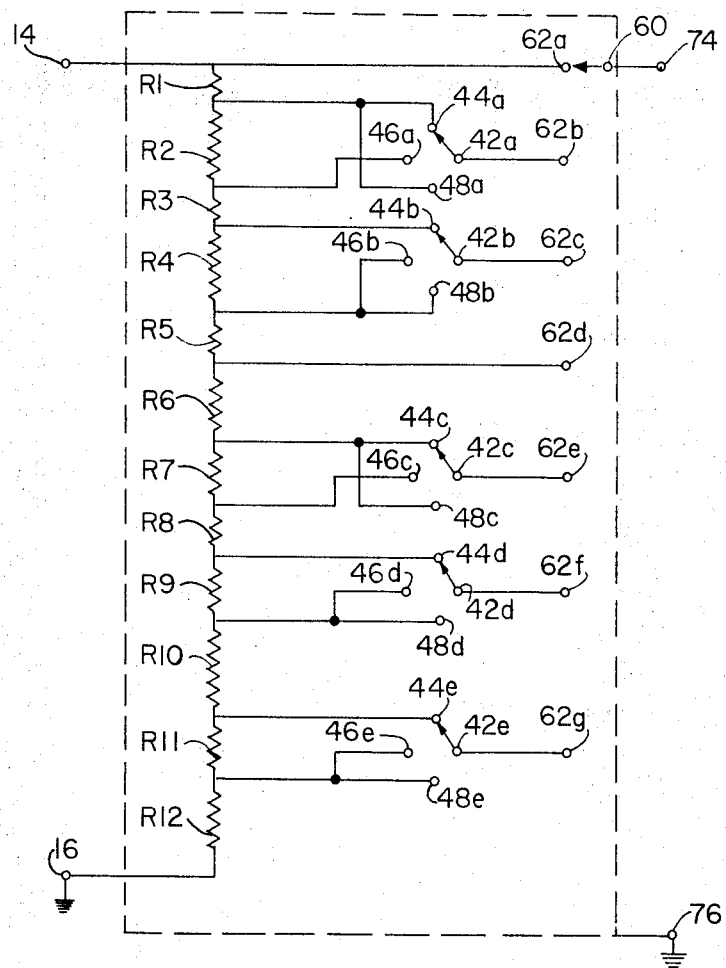

FIGS. 3 and 4 are sectional views taken along lines 3—3 and 4—4, respectively, of FIG. 2;

FIG. 5 is a schematic wiring diagram of the attenuator shown in FIG. 1;

FIG. 6 is an exploded view of the range selector knob and dial assembly; and

FIG. 7 is a view partially broken away and sectioned of the knob and dial of FIG. 6 assembled on a control panel.

FIG. 1 shows in block diagram form a portion of material testing apparatus of a known type in which a load cell 10 converts the load applied to a specimen being tested into an electrical signal. The load capable of being applied by the apparatus is limited in part by the maximum capacity of cell 10, and, from time to time as testing requirements change, cell 10 is replaced by another load cell having a different maximum capacity.

The output of cell 10 is amplified by amplifier 12 the output of which is in turn applied to the input terminals 14 and 16 (FIGS. 2, 5) of attenuator 18 which includes range selector 21. The attenuated voltage is amplified by amplifier 22, the output of which activates readout recorder 24.

Selector 21 (FIG. 2) includes a pair of multiple position switches 26 and 28 mounted in a common housing 30 with concentric control shafts 32 and 34, respectively.

Shaft 32 carries rotor 36 on the face of which are mounted five dual pronger wiper arms 38a–e. Contact panel 40 (FIG. 3) provides five arcuate contact strips 42a–e, and, respectively adjacent to each strip, five sets of three spot contacts 44a–e, 46a–e, and 48a–e. Arms 38a–e extend radially of the rotor at equal angular intervals, and the prongs 50a–e, 52a–e of each arm respectively cooperate with one of strips 42a–e and its corresponding contacts 44a–e, 46a–e, and 48a–e. Detent wheel 51 and spring biased arm 53 fix three rotative positions for shaft 32, in each of which each arm 38a–e is, through its prongs, in contact with its respective strip 42a–e and one of its respective three contacts 44a–e, 46a–e and 48a–e.

Shaft 34 carries rotor 54 on the face of which is mounted one dual pronged wiper arm 56. Contact panel 58 (FIG. 4) provides a circular contact strip 60 and seven spot contacts 62a–g circumferentially spaced at equal angular intervals so that prongs 64 and 66, respectively, of arm 56 contact strip 60 and one of contacts 62a–g in each of the seven rotative positions fixed for shaft 34 by detent wheel 68 and spring biased arm 70.

Resistors R1–R12 (having respective values of 1000, 200, 300, 100, 200, 100, 20, 30, 10, 15, 15 and 20 ohms) are mounted between panel 58 and back panel 72 of attenuator 18 and are wired to each other in series and to the various elements described above as indicated in FIG. 5.

Input terminals 14 and 16 (wired to resistors R1 and R12 respectively), output terminal 74 (wired to strip 60), and ground terminal 76 are provided on the outside of back panel 72.

Attenuator 18 is mounted on the inside of control panel 78 with shafts 32 and 34 extending through opening 80 and respectively carrying dial 82 and knob 84.

Dial 82 has a clear plastic face 86 on which appear black numerals 88 (FIG. 6). Numerals 88 represent values of applied load that will correspond to full scale deflection of recorder 24, and they have angular spacings on face 86 equal to the angular spacings between adjacent contacts 62a–g. The circular portion of panel 78 behind face 86 has a white semicircular zone 90 and a black semicircular zone 92. Knob 84 has a pointer 94.

In operation, for a given load cell 10, range selector dial 82 is rotated to set switch 26 to that position providing the desired sequence of effective attenuator taps for contacts 62a–g. (Resistors R1–R12 of the values described are suitable for use with load cells whose capacities are fifty, one hundred, or two hundred pounds, or multiples of ten thereof.) In each position of dial 82 six of black numerals 88 are positioned in front of and contrast with white zone 90 and are clearly visible, while the remaining two numerals are obscured by the black background of zone 92. Pointer 94 on load selector knob 84 is then rotated to one of the six visible numerals 88 to set switch 28 to the tap setting 62a–f for which application of the load indicated by pointer 94 causes full scale deflection of recorder 24.

In addition, pointer 94 may be rotated clockwise one position beyond the highest visible numeral 88 to set switch 28 to a seventh tap setting corresponding to contact 62g, which is suitable for use with additional equipment (not shown) to convert recorder 24 to a center-zero scale capable of measuring both compressive and tensile loads applied to test specimens.

Other embodiments will occur to those skilled in the art and are within the following claims:

What is claimed is:

1. In material testing apparatus employing interchangeable electro-mechanical transducing elements respectively useful over different ranges of a quantity being measured, an attenuator for receiving the electrical output of any said element currently operative and providing an electrical output proportional to said output of said element, said attenuator comprising:

a plurality of resistors connected in series,
a first multi-position switch,
a plurality of electrical taps from said switch to different junctions between pairs of said resistors so that for each position of said switch a different total electrical resistance is operatively included in said attenuator,
a second multi-position switch electrically interposed between said first switch and said junctions for changing the operative location of at least one of said taps, each position of said second switch thereby providing a different sequence of said total electrical resistances corresponding to said positions of said first switch,
a dial portion operatively connected to said second switch and carrying indicia corresponding to said total resistance, said portion being movable to a plurality of positions corresponding respectively to said positions of said second switch, and
an indicator mounted adjacent said portion for movement independent of said portion and having a plurality of positions respectively corresponding to said positions of said first switch, said indicator indicating a different one of said indicia for each position of said first switch, said indicated indicium for each position of said first switch varying with the position of said second switch.

2. The device of claim 1 further comprising a pair of concentric shafts for respectively operating said switches, said portion being operatively carried by said shaft of said second switch, each said sequence including at least one total electrical resistance not present in at least another said sequence, said attenuator including a surface for at least reducing the visibility of any of said indicia corresponding to a total electrical resistance not present in the sequence corresponding to the current position of said second switch.

3. The device of claim 2 wherein said portion comprises a transparent surface carrying said indicia, and the background to said transparent surface is stationary and has one zone colored to contrast with said indicia and another zone colored similarly to said indicia, so that only those indicia located in front of said contrasting zone are easily visible.

References Cited

UNITED STATES PATENTS

| | | | |
|---|---|---|---|
| 2,786,122 | 3/1957 | Strain | 338—48 |
| 2,883,617 | 4/1959 | Lathrop | 324—62 |
| 2,927,168 | 3/1960 | Brown | 200—18 |
| 3,198,923 | 8/1965 | Tripp | 200—167 |
| 3,443,221 | 5/1969 | McGill | 329—63 |

RICHARD C. QUEISSER, Primary Examiner

J. WHALEN, Assistant Examiner

U.S. Cl. X.R.

338—134, 191, 196; 200—14; 73—141; 116—133; 323—97